United States Patent [19]

Togashi et al.

[11] Patent Number: 5,691,906

[45] Date of Patent: Nov. 25, 1997

[54] METHOD OF MANAGEMENT OF A PRODUCTION LINE AND A SYSTEM FOR USE IN THE MANAGEMENT

[75] Inventors: Takako Togashi; Yukihiro Muraoka, both of Yamagata, Japan

[73] Assignee: NEC Corporation, Tokyo, Japan

[21] Appl. No.: 560,690

[22] Filed: Nov. 20, 1995

[30] Foreign Application Priority Data

Nov. 22, 1994 [JP] Japan .................................. 6-287718

[51] Int. Cl.$^6$ ................................................ G06F 19/00
[52] U.S. Cl. ..................... 364/468.15; 364/552; 364/578
[58] Field of Search ........................ 364/468.15, 468.16, 364/468.17, 468.18, 468.03, 468.05, 578, 552, 554, 156, 550, 551.01; 395/207–211

[56] References Cited

U.S. PATENT DOCUMENTS

| | | | |
|---|---|---|---|
| 4,807,108 | 2/1989 | Ben-Arieh et al. | 364/468.05 |
| 4,901,242 | 2/1990 | Kotan | 364/468.15 |
| 5,351,202 | 9/1994 | Kurtzberg et al. | 364/468.15 X |
| 5,440,478 | 8/1995 | Fisher et al. | 364/468.16 |
| 5,539,652 | 7/1996 | Tegethoff | 364/468.03 X |

FOREIGN PATENT DOCUMENTS 2146795  4/1985  United Kingdom.

*Primary Examiner*—Joseph Ruggiero
*Attorney, Agent, or Firm*—Sughrue, Mion, Zinn, Macpeak & Seas, PLLC

[57] ABSTRACT

For managing a production line which includes a plurality of facilities for carrying out a production process to produce products of a target quantity, use is made of a production simulator (22). In managing the production line, the production simulator makes the production process have a virtual stop period for a selected one of the facilities. The production simulator executes a simulation of the production process excepting the virtual stop period to produce a simulated quantity. With the simulated quantity being compared with the target quantity, the production simulator produces an allowed stop period of the production process so that the allowed stop period uninfluences on the target quantity. Therefore, it is possible to stop the selected facility during the allowed stop period.

9 Claims, 5 Drawing Sheets

METHOD OF MANAGEMENT OF A PRODUCTION LINE AND A SYSTEM FOR USE IN THE MANAGEMENT

BACKGROUND OF THE INVENTION

This invention relates to a method of management of a production line for producing various products and to a system for use in the management thereof.

Generally, such a production line includes a plurality of production facilities for carrying out a production process to produce products. In a manner known in the art, the production line is managed to produce the products with high efficiency.

In a conventional method of managing the production line, production of the products is carried out during the production process. During production, judgement is made as to whether or not an actual quantity of the production reaches a target quantity of the production in the production line. Conventionally, an expert investigates for the cause of such a shortfall only when the target quantity is not achieved. As one of the aspects of the investigation, an operating condition of each of the production facilities is investigated. The expert then surmises, by intuition and experience, whether the operating condition is influencing the production. In absence of such an influence, another investigation of the cause of the shortfall is made anew. When the expert determines what the source of the undesirable influence is, the investigation of the cause of the shortfall is completed. In this event, a relationship between the operating condition and the real quantity of production is reflected in the production management for the next month.

The above-mentioned conventional method has the following disadvantages. That is, the conventional method does not grasp the influence of the stoppage of the selected one of the production facilities upon the real quantity of production. Also, when the target production quantity is not achieved, the cause of the shortfall is only surmised and is dealt with by no more than intuition and experience. Thus, the conventional method does not provide a sufficient solution.

SUMMARY OF THE INVENTION

It is therefore an object of this invention to provide a method of managing a production line, in which the influence of the stoppage of each production facility is quantitatively grasped.

It is another object of this invention to provide a method of the type described, in which the influence is predicted and controlled so as to enable achievement of the target quantity of production.

It is still another object of this invention to provide a system for use in managing the production line, which system is capable of quantitatively grasping the influence of the stoppage of each production facility.

According to one embodiment of the invention, there is provided a method of managing a production line in which a product is produced using a plurality of production facilities. The method includes providing a production simulator responsive to data including (1) maximum operating rate data for each production facility, (2) product processing time data for each production facility, (3) product processing route data, (4) product feed data, and (5) products-in-process data for each production facility. The method also includes inputting the data to the production simulator, executing on the production simulator a simulation; and predicting and controlling an influence of a stopped one of the plurality of production facilities on a production quantity, on the basis of results of the simulation, wherein the simulation models the plurality of production facilities taking into account a production facility stop period preliminarily determined by controlling a products-in-process transition in the one of the plurality of production facilities.

According to another embodiment of the invention, there is provided a system for use in managing a production line which includes a plurality of facilities for carrying out a production process to produce products of a target quantity, the system including means for determining how a virtual stop period for a selected one of the facilities influences the production process, means for executing a simulation of the production process modified by the virtual stop period to provide a simulated quantity, the executing means being connected to the determining means, and means for producing an allowed stop period for the modified production process based on a comparison of the simulated quantity and the target quantity, the producing means being connected to the executing means, the allowed stop period being characterized in that the simulated quantity of produced products is at least the target quantity.

DESCRIPTION OF THE PREFERRED EMBODIMENTS

Figure 1:
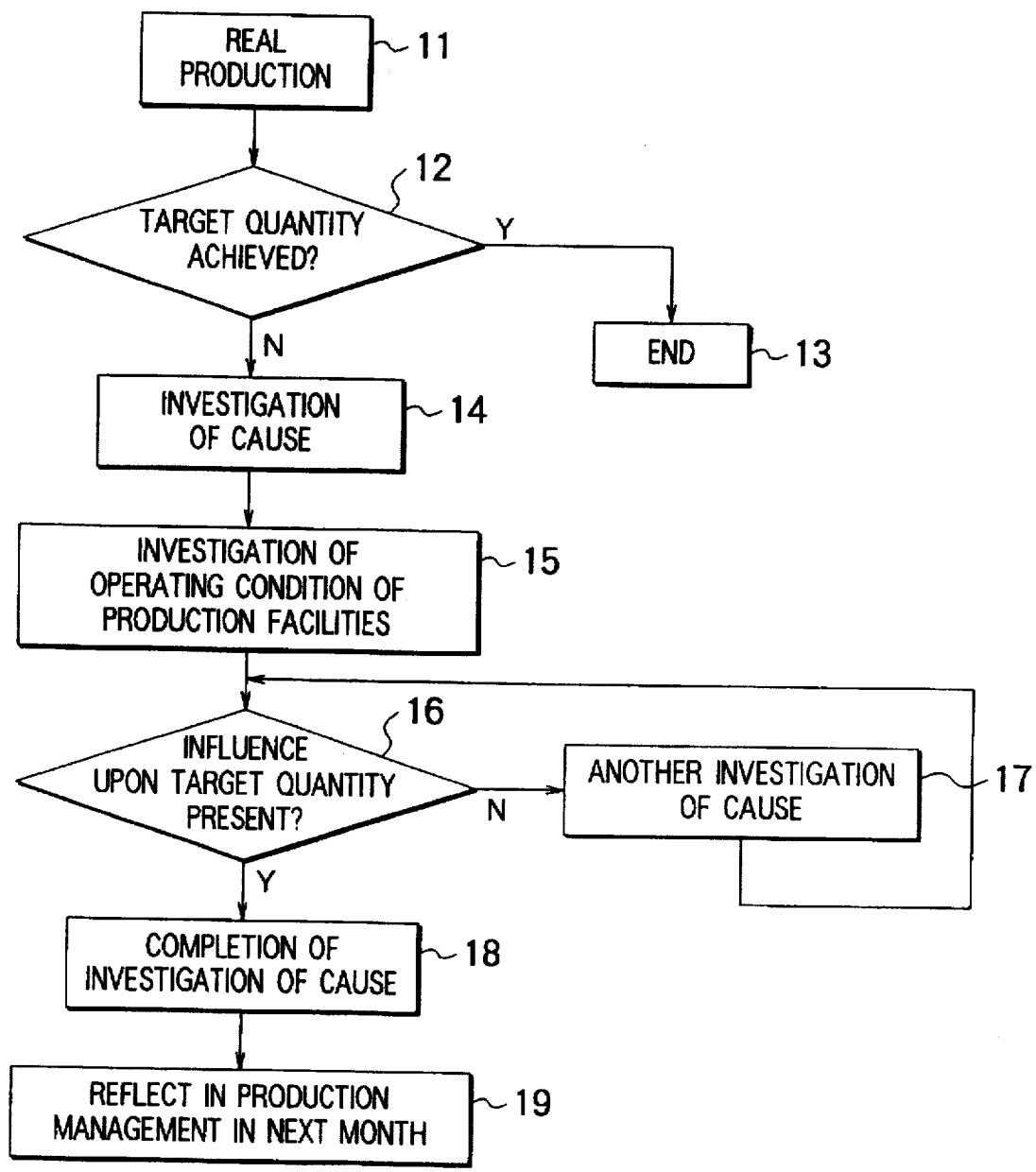
FIG. 1 is a flow chart illustrating a conventional method of managing a production line.

Referring to FIG. 1, description will first be made with regard to a conventional method of managing a production line so as to provide for a better understanding of the invention. The production line includes a plurality of production facilities for carrying out a production process in which products are produced.

In the conventional method, production of the products is actually carried out through the production process at step 11. At step 12, a judgement is made whether an actual quantity of the production reaches a target quantity of the production in the production line. When the target quantity is achieved, the operation comes to an end at step 13. When it is not achieved, an expert investigates the cause at step 14. As part of the investigation, the respective operating condition of each of the production facilities is investigated at step 15. At step 16, the expert surmises, by intuition and experience, whether an operating condition is influencing the production. In absence of such an influence, another investigation of the cause is made anew at step 17. When it is surmised by the expert that the negative influence is detected, the investigation of the cause is completed at step 18. In this event, a relationship between the operating condition and the real quantity of production is reflected in the production management for the next month at step 19.

As already briefly mentioned, the conventional method is disadvantageous in that the influence of the stoppage of the selected one of the production facilities upon the real quantity of production is not quantitatively grasped. Furthermore, when the target quantity of production is not achieved, the cause is surmised and dealt with through only intuition and experience. Thus, a sufficient solution to the production problem is not given.

Figure 2:
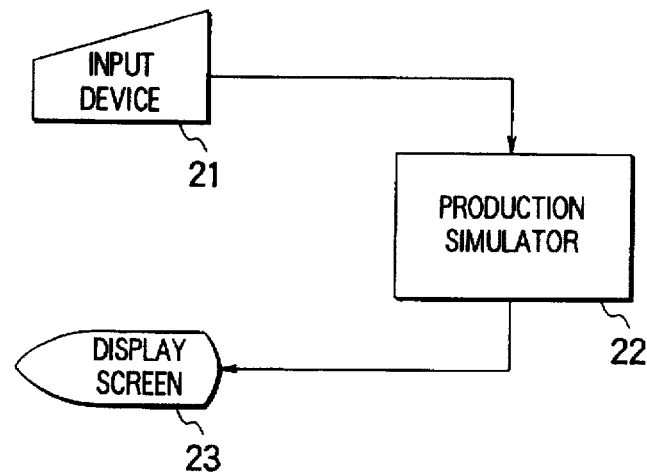
FIG. 2 is a view illustrating a system according embodiment of this invention.

Turning to FIG. 2, a description will be made regarding an exemplary system according to a first embodiment of this invention. The system is for use in managing a production line which includes a plurality of production facilities for carrying out a production process to produce real products.

In the manner which will presently be described, the system comprises an input device 21, a production simulator 22 connected to the input device 21, and a display screen 23 connected to the production simulator 22.

The input device 21 is for inputting various data including maximum operating rate data, product processing time data, product processing route data, product feed data, and products-in-process data for each of the production facilities. The maximum operating rate data represent a maximum rate at which each of the production facilities can be operated. The product processing time data represent a time period required for processing each product. The product processing route data represent a route among the production facilities. The product feed data represent a quantity of the products fed into each of the production facilities. The products-in-process data represent a quantity of products-in-process in relation to each of the production facilities.

By the use of those data, the production simulator 22 executes a predetermined operation to produce a simulation result in the manner which will later be described in detail. The display screen 23 is for displaying the simulation result in a known manner.

Figure 3:
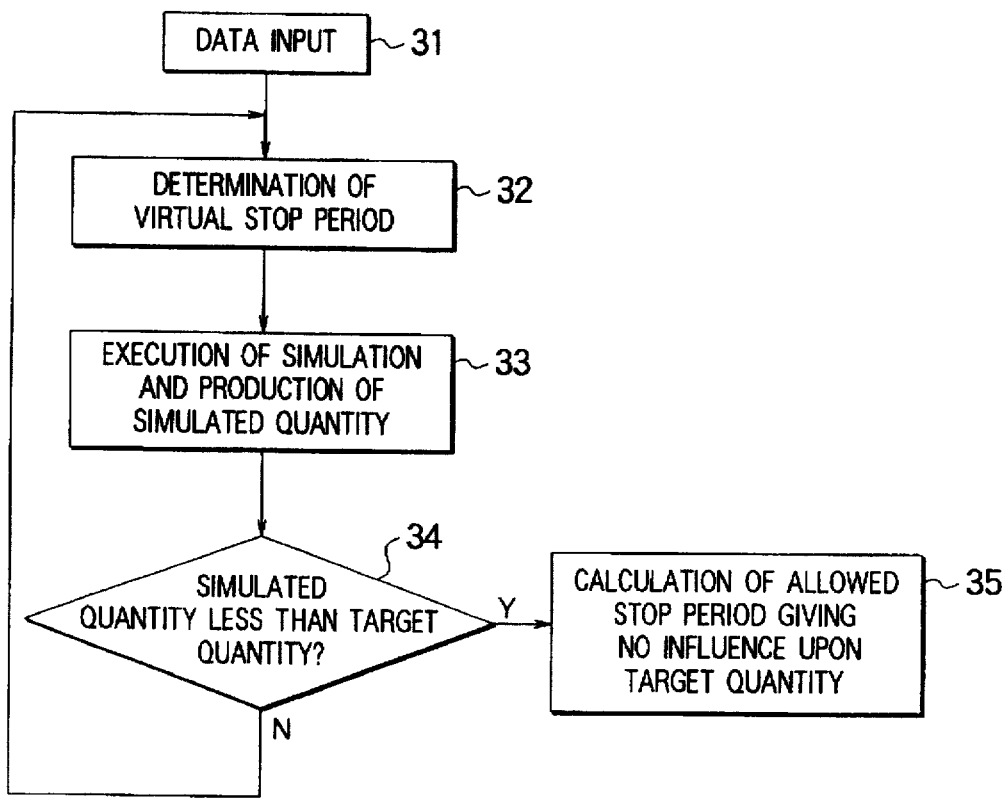
FIG. 3 is a flow chart describing the system illustrated in FIG. 2.

Referring to FIG. 3 together with FIG. 2, the description will now be directed to the operation of the system.

After inputting the various data through the input device 21 at a first step 31, an operator manually determines, on the production simulator 22 (through the input device 21), a virtual stop period of the production process with respect to a selected one of the production facilities at a second step 32. When carrying out the second step 32, the production simulator 22 may be referred to as a determining arrangement. The virtual stop period may be referred to as a determining condition for the subsequent simulation of the production process.

Upon this determined condition, the production simulator 22 executes simulation of the production process as normal, except for the simulation of the virtual stop period at a third step 33. In other words, the production simulator 22 simulates the way production is affected by the determining condition. Whenever the simulation is carried out, the production simulator 22 produces the simulation result as a simulated quantity which represents a number of products produced in the simulation. When carrying out the third step 33, the production simulator 22 may be referred to as an executing arrangement.

The third step 33 is followed by a fourth step 34 at which the production simulator 22 judges, or determines, whether the simulated quantity is less than a target quantity which represents a target number of products produced in the production line. When carrying out the fourth step 34, the production simulator 22 may be referred to as a simulated quantity judging arrangement.

When the simulated quantity is not less than the target quantity, the fourth step 34 returns to the second step 32 at which the operator manually modifies the virtual stop period. When the simulated quantity is less than the target quantity, the fourth step 34 proceeds to a fifth step 35 at which the production simulator 22 calculates an allowed stop period of the production process with reference to the virtual stop period. That is, the production simulator 22 calculates a period, called the allowed stop period, whereby the particular stoppage may occur without influencing the target quantity. To put it another way, the allowed stop period can be understood to be the maximum duration of a stoppage which may be tolerated in the production line without causing production to fall below the target quantity. The allowed stop period is displayed on the display screen 23. On carrying out the fifth step 35, the production simulator 22 may be referred to as a calculating arrangement. A combination of the simulated quantity judging and the calculating arrangements may be referred to as a producing arrangement.

Figure 4:
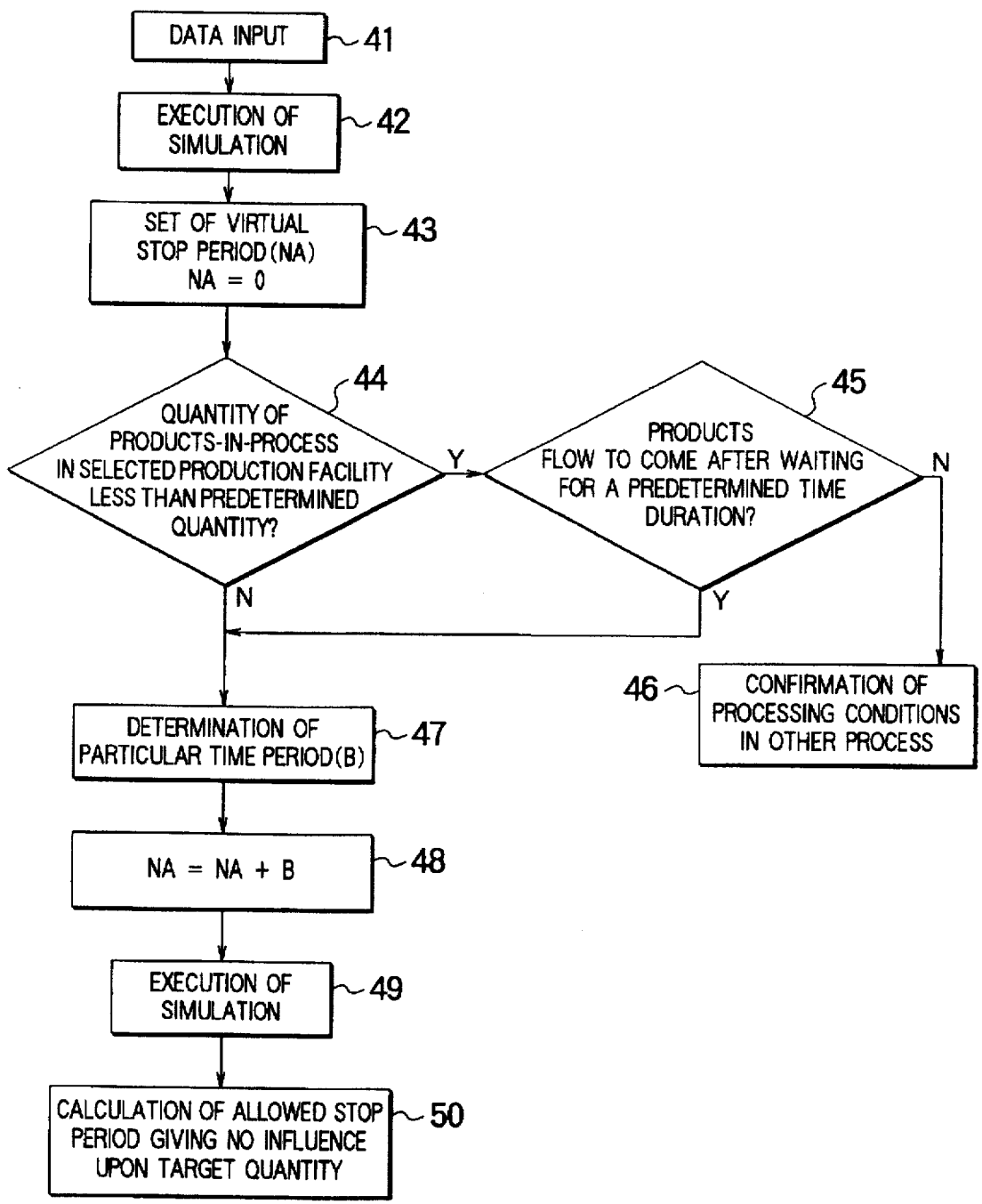
FIG. 4 is a flow chart describing a system according to a second embodiment of this invention.

Referring to FIG. 4 together with FIG. 2, a description will be made with respect to a system according to a second embodiment of this invention. The system is for use in managing the production line.

Prior to execution of the simulation, the operator enters the above-mentioned various data to the production simulator 22 through the input device 21 at a first step 41.

The first step 41 is followed by a second step 42 at which the production simulator 22 executes the simulation with reference to those data. At this time, leveled simulation is executed. In leveled simulation, production is simulated with no virtual stop period being set.

The second step 42 is followed by a third step 43 at which zero is set to the virtual stop period. The third step 43 is followed by a fourth step 44.

At the fourth step 44, the production simulator 22 automatically judges, with reference to the simulation result, whether the quantity of products-in-process in the selected production facility is less than a predetermined quantity that equals a particular percent of the average daily finished products. Preferably, the predetermined quantity is 10% of the average daily finished products. When carrying out the fourth step 44, the production simulator 22 may be referred to as a products-in-process quantity judging arrangement.

If the quantity of products-in-process is less than the predetermined quantity, the fourth step 44 proceeds to a fifth step 45 at which the production simulator 22 judges whether the quantity of products-in-process will be increased by a products flow to come. The products flow to come is determined after the simulation of a wait for a predetermined time duration. If there is no products flow to come, product processing conditions in other processes are confirmed at a sixth step 46. In addition, a particular one of the production facilities is presumed to be the cause and is displayed on the display screen 23. If there is a products flow to come after waiting for a predetermined time duration at the fifth step 45, then the operation proceeds to a seventh step 47. When carrying out the fifth step 45, the production simulator 22 may be referred to as a reception judging arrangement.

Now, consideration will be given to the case in which it is judged, at the fourth step 44, that the quantity of the products-in-process in the selected production facility is equal to or greater than the predetermined quantity. In this event, operation after the fourth step 44 proceeds to the seventh step 47.

At the seventh step 47, the production simulator 22 automatically determines a particular time period (B) with reference to the quantity of the products-in-process and to the predetermined quantity. More particularly, the particular time period B is selected from a time duration during which the quantity of the products-in-process are greater than or equal to the predetermined quantity. For example, the particular time period may be equal to one day.

The seventh step 47 is followed by an eighth step 48 at which the particular time period is added to the virtual stop period. As a result, modification is carried out about the virtual stop period. When carrying out the seventh and the eighth steps 47 and 48, the production simulator 22 may referred to as the determining arrangement.

The eighth step 48 is followed by a ninth step 49 at which the production simulator 22 executes the simulation with reference to the virtual stop period by the use of the above-mentioned various data. More particularly, the production simulator 22 executes the simulation of the production process excepting the virtual stop period. The production simulator carries out the simulation and produces the simulation result, namely, the simulated quantity. When carrying out the When carrying out the ninth step 49, the production simulator 22 may be referred to as the executing arrangement.

The ninth step 49 is followed by a tenth step 50 at which the production simulator 22 calculates the allowed stop period of the production process with reference to the virtual stop period. For example, the allowed stop period may be calculated by subtracting one day from the virtual stop period. The allowed stop period is displayed on the display screen 23.

Management of the production line may be performed with reference to the allowed stop period on the display screen 23. That is, the operator may carry out predictions and, accordingly, may control the influence of a stoppage of a production facility upon the quantity of production. When carrying out the tenth step 50, the production simulator 22 may referred to as the producing arrangement.

Figure 5:
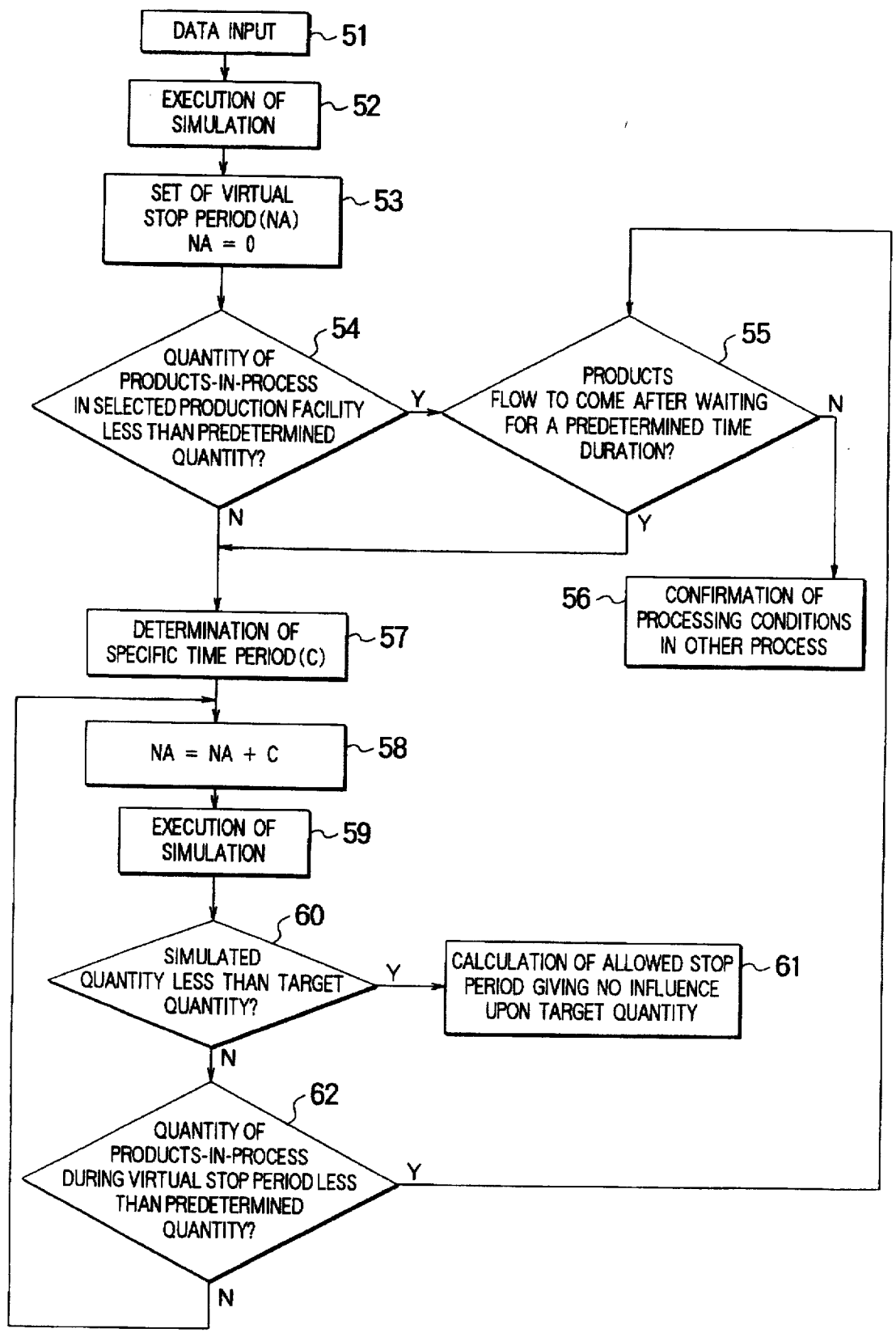
FIG. 5 is a flow chart describing a system according to a third embodiment of this invention.

Referring to FIG. 5 together with FIG. 2, the description will be directed to a system according to a third embodiment of this invention. The system according to this third embodiment has steps that are similar to those described with reference to FIG. 4. In particular, the system according to this embodiment has respective first, second, third, fourth, fifth, and sixth steps (i.e., 51, 52, 53, 54, 55, and 56) which are similar to the first, the second, the third, the fourth, the fifth, and the sixth steps (i.e., 41, 42, 43, 44, 45, and 46) of FIG. 4, respectively.

In the system according to the third embodiment, each of the fourth and the fifth steps 54 and 55 is followed by a seventh step 57 at which the production simulator 22 automatically determines a specific time period (C) with reference to the quantity of the products-in-process and to the predetermined quantity. More particularly, the specific time period is selected from a time duration during which the quantity of the products-in-process are not smaller than the predetermined quantity. For example, the specific time period is equal to half of a day.

The seventh step 57 is followed by an eighth step 58 at which the specific time period is added to the virtual stop period. As a result, modification is carried out about the virtual stop period. When carrying out the seventh and the eighth steps 57 and 58, the production simulator 22 may be referred to as the determining arrangement.

The eighth step 58 is followed by a ninth step 59 at which the production simulator 22 executes the simulation with reference to the virtual stop period by the use of the above-mentioned various data. More particularly, the production simulator 22 executes the simulation of the production process excepting the virtual stop period. The production simulator 22 carries out the simulation and produces the simulation result, namely, the simulated quantity. When carrying out the ninth step 59, the production simulator 22 may be referred to as the executing arrangement.

The ninth step 59 is followed by a tenth step 60 at which the production simulator 22 judges about whether or not the simulated quantity is less than the target quantity. When carrying out the tenth step 60, the production simulator 22 may be referred to as the simulated quantity judging arrangement.

When the simulated quantity is less than the target quantity, the tenth step 60 proceeds to an eleventh step 61 at which the production simulator 22 calculates the allowed stop period of the production process with reference to the virtual stop period. For example, the allowed stop period is calculated by subtracting a half day from the virtual stop period. The allowed stop period is displayed on the display screen 23. With reference to the allowed stop period on the display screen 23, the operator carries out prediction and control of the influence of the stoppage of the selected production facility upon the quantity of production to thereby manage the production line. When carrying out the eleventh step 61, the production simulator 22 may be referred to as the producing arrangement.

When the simulated quantity is not less than the target quantity, the tenth step 60 proceeds to a twelfth step 62 at which the production simulator 22 judges whether the quantity of the products-in-process during the virtual stop period is less than the predetermined quantity.

When the quantity of the products-in-process in the virtual stop period is less than the predetermined quantity, the twelfth step 62 returns to the fifth step 55. Otherwise, the twelfth step 62 returns to the eighth step 58 at which the specific period is added to the virtual stop period again. This results in executing the simulation with the virtual stop period being increased or extended step by step while the simulated quantity is less than the target quantity. When carrying out the twelfth step 62, the production simulator 22 may be referred to as an additional quantity judging arrangement.

Figure 6:
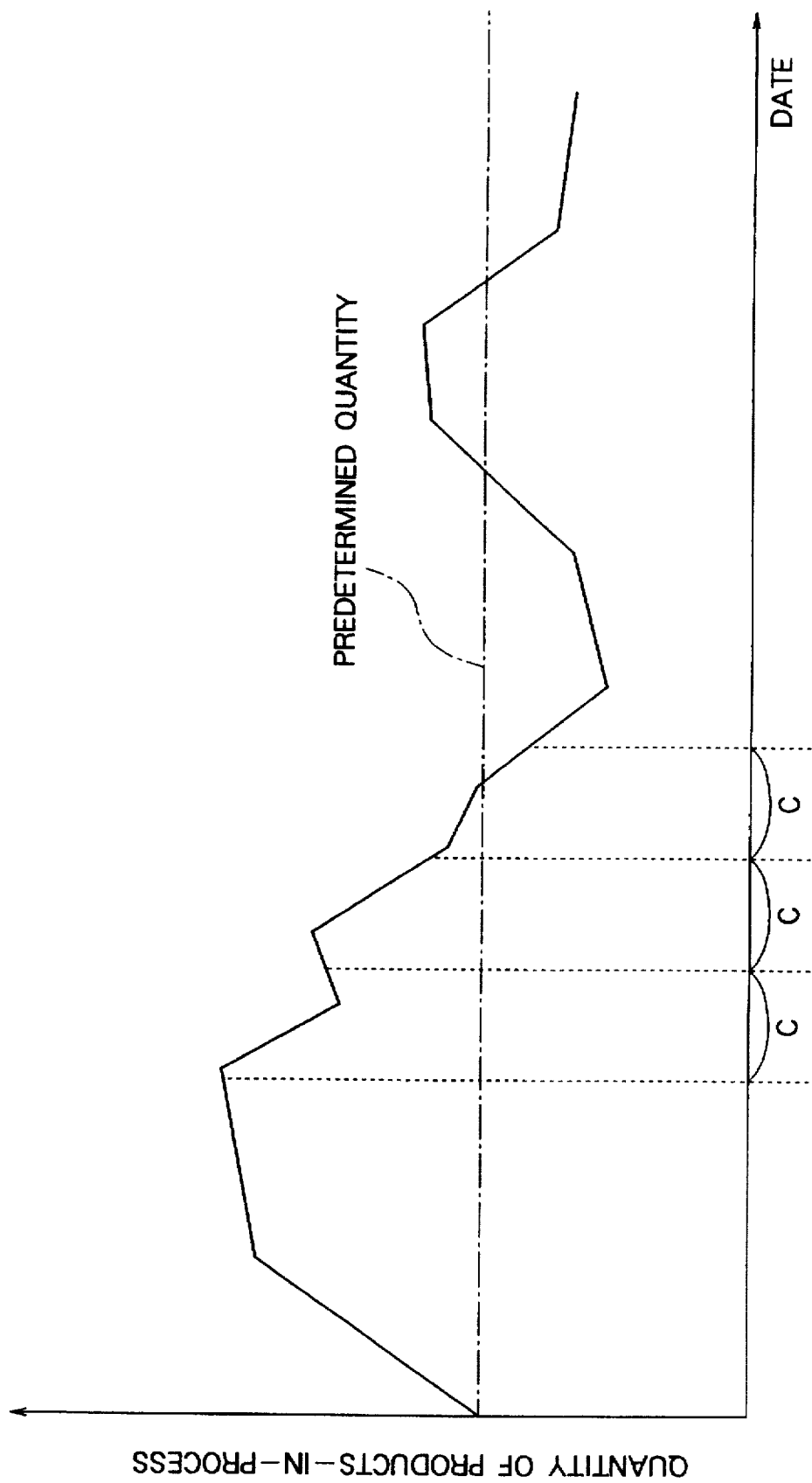
FIG. 6 is a view exemplifying a transition of a quantity of products-in-process in a selected one of production facilities.

The virtual stop period will now be described with reference to FIG. 6.

At first, a specific time period (C) is determined as a first virtual stop period. The simulation is executed using the first virtual stop period (i.e., the value C). Next, the specific time period (C) is added to the first virtual stop period to produce a second virtual stop period (i.e., C+C). The simulation is then executed using this second virtual stop period. Next, the specific time period (C) is added to the second virtual stop period to produce a third virtual stop period (i.e., C+C+C). Then, simulation is executed with the third virtual stop period. It is to be noted that, in the example of FIG. 6, the quantity of the products-in-process became less than the predetermined quantity in the last-mentioned case (i.e., when the simulation was run using the third virtual stop period).

As described above, a large number of parameters related to the production are simultaneously used. Among the production-related parameters, the production facility stop condition and the products-in-process condition are automatically controlled. It is then possible repeatedly to use the simulation model in conformity with the real production line. Thus, the influence finally given to the quantity of production by the stoppage of the selected production facility is predicted and controlled so as to enable achievement of the target quantity of production.

While the present invention has thus far been described in connection with a few embodiments thereof, it will readily be possible for those skilled in the art to put this invention into practice in various other manners. For example, each of the particular and the specific time periods may be modified into another time period.

We claim:

1. A method of managing a production line in which a product is produced using a plurality of production facilities, the method comprising:

providing a production simulator responsive to data including:
maximum operating rate data for each said production facility,
product processing time data for each said production facility,
product processing route data,
product feed data, and
products-in-process data for each said production facility;

inputting said data to said production simulator;

executing on said production simulator a simulation; and predicting and controlling an influence of a stopped one of said plurality of production facilities on a production quantity, on the basis of results of said simulation;

wherein said simulation models said plurality of production facilities taking into account a production facility stop period preliminarily determined by controlling a products-in-process transition in said one of said plurality of production facilities.

2. A method of managing a production line as claimed in claim 1, wherein said products-in-process transition of said one of said plurality of production facilities is manually controlled.

3. A method of managing a production line as claimed in claim 1, wherein said products-in-process transition of said one of said plurality of production facilities is automatically controlled.

4. A method of managing a production line as claimed in claim 3, further comprising:

automatically executing said simulation using a determined facility stop period and time schedule; and repeating said simulation until a predetermined target production quantity is achieved for said one of said plurality of production facilities;

whereby prediction and control of said influence of said stopped one of said plurality of production facilities on said production quantity achieves said target production quantity.

5. A system for use in managing a production line which includes a plurality of facilities for carrying out a production process to produce products of a target quantity, said system comprising:

means for determining how a virtual stop period for a selected one of said facilities influences said production process;

means for executing a simulation of said production process modified by said virtual stop period to provide a simulated quantity, said executing means being connected to said determining means; and means for producing an allowed stop period for said modified production process based on a comparison of said simulated quantity and said target quantity said producing means being connected to said executing means; said allowed stop period being characterized in that said simulated quantity of produced products is at least said target quantity.

6. A system as claimed in claim 5, wherein said producing means comprises:

means for judging whether said simulated quantity is less than said target quantity, said simulated quantity judging means being connected to said executing means; and means for calculating said allowed stop period only when said simulated quantity is less than said target quantity, said calculating means being connected to said simulated quantity judging means.

7. A system as claimed in claim 6, further comprising: means for judging a products-in-process quantity, connected to said determining means, for judging whether said products-in-process quantity of said selected one of said plurality of facilities is less than a predetermined quantity, said determining means modifying said virtual stop period only when said products-in-process quantity is not less than said predetermined quantity.

8. A system as claimed in claim 7, further comprising:

reception judging means, connected to said products-in-process quantity judging means and said determining means, for judging whether said selected one of said plurality of facilities receives said products-in-process during a predetermined time duration, said judging being performed when said products-in-process quantity is less than said predetermined quantity, said determining means modifying said virtual stop period only when said selected one of said plurality of facilities receives said quantity of products-in-process during said predetermined time duration.

9. A system as claimed in claim 8, further comprising:

additional quantity judging means, connected to said simulated quantity judging means, said determining means, and said reception judging means;

said additional quantity judging means being a means for judging whether said products-in-process quantity is less than said predetermined quantity during said virtual stop period;

said determining means modifying said virtual stop period when said products-in-process quantity is not less than said predetermined quantity;

said reception judging means judging whether said selected one of said plurality of facilities receives said products-in-process in said predetermined time duration in which said products-in-process quantity is less than said predetermined quantity.

* * * * *